Figure 1:
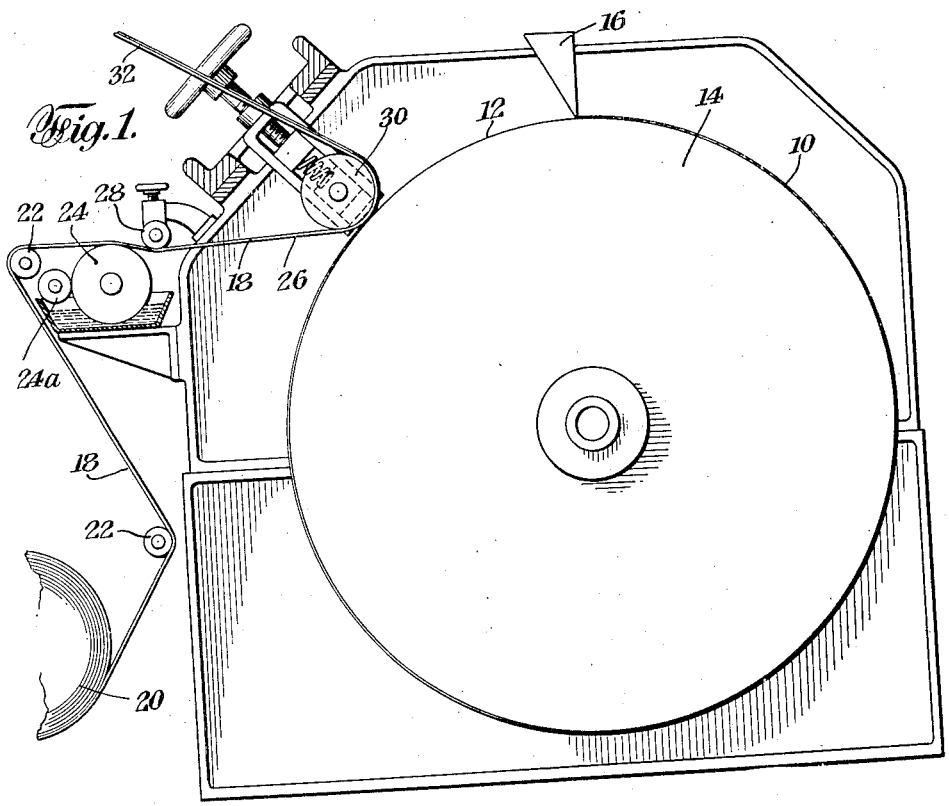

Aug. 15, 1939    R. S. REYNOLDS    2,169,288
CONTINUOUS PROCESS OF CASTING THIN FILM
Filed May 18, 1935

INVENTOR
Richard S. Reynolds
BY John A. Bliss
ATTORNEY

Patented Aug. 15, 1939

2,169,288

UNITED STATES PATENT OFFICE 2,169,288

CONTINUOUS PROCESS OF CASTING THIN FILM

Richard S. Reynolds, Glen Cove, N. Y.

Application May 18, 1935, Serial No. 22,191

1 Claim. (Cl. 154—40)

This invention relates generally to a continuous process for forming an extremely thin film of insufficient tensile strength for ordinary commercial handling and to the product resulting therefrom; and among other objects particularly relates to a continuous process for forming an extremely thin waterproof rubber hydrochloride film of insufficient tensile strength for ordinary commercial handling and the removal of such film from a rigid means upon which the same is formed by preferably a paper backing.

Heretofore it has not ordinarily been thought commercially practical to film or cast cellulosic derivative or rubber derivative films below a thickness of approximately .0008 of an inch, because of the difficulties involved in stripping such film from the medium upon which they are cast, and involved in their subsequent treatment and handling. Films formed by driving off a volatile solvent and cast upon a heated revolving drum or belt can be easily made of a thinness of .0001 of an inch, but up to this time it has not been feasible to form and strip such films at commercial speeds because of tearing and mutilating the film; even if such stripping could be accomplished commercially for films below .0008" thickness, it has generally been accepted that films below such thickness could not be subsequently treated and handled commercially because of the lack of tensile strength of the film.

However, I have devised a continuous process for casting, stripping and handling cellulosic derivative or rubber derivative films far below .0008 of an inch in thickness. The thin film is cast upon the usual rigid surface, preferably upon a revolving drum, in the common manner well known in the art, but such film possesses insufficient tensile strength to be stripped commercially by itself from the drum. Therefore, I provide a flexible paper strip, or other material, travelling at approximately the same rate of speed and in the same general direction as the drum or metallic belt and ordinarily provided with an adhesive, and apply such strip of paper to the film so that the two firmly adhere one to the other and form a flexible laminated material adapted to be handled and rolled like paper. The tensile strength of the paper backer or strip should be sufficient to lift the film from the casting medium commercially without danger of tearing or mutilating any part of the laminated material.

A particular application for my process is in the forming of rubber hydrochloride film of a range of .0001"—.0008" thickness and the supplying of such weak film of generally insufficient tensile strength to be commercially continuously stripped by itself, with a paper back. An 8% solution of rubber hydrochloride in chloroform readily forms a transparent film when the volatile solvent is driven off by heat and there is a phase at which the solvent has been largely driven off when the heated rubber hydrochloride film is slightly tacky due both to its solvent content and its thermoplastic qualities.

Where this rubber hydrochloride film has insufficient strength for normal commercial stripping and handling, a stripping means ordinarily comprising a paper backer which may have a slight amount of adhesive thereon, is pressed against the film so that it will adhere thereto. Thereupon, the paper and rubber hydrochloride film which adhere together in laminated form can be stripped as an integral unit from a drum or belt without danger of tearing or mutilating the thin film. The lack of tensile strength in the rubber film is compensated by the tensile strength of the paper, thereby allowing commercial handling of the laminated combination. It is manifest that a lesser amount of material is used when films of insufficient tensile strength are bonded and removed from the medium upon which they are cast by a backing means which supports them in the stripping operation; this allows important economies not heretofore realized, and applies both to cellulosic derivative film as well as to rubber derivative film. There are many uses for such laminated material.

Also it is apparent that any flexible material having the necessary tensile strength and handling qualities could be used in place of the paper backer to strip films of insufficient tensile strength from the medium upon which they are cast. It is well recognized that where the film solution is directly applied to the paper that the latter absorbs the film to a degree, and the film is not smooth and even; in fact, the film when thin will often have holes through the same.

It is further apparent that where laminations of cellulosic derivative or rubber derivative film and paper, or material having similar appropriate qualities, is desired that the continuous process of directly applying the paper to the film when the latter is on a drum is highly desirable; particularly because the lamination of the film is accomplished upon the same medium upon which it is cast, and so a minimum of handling of the film by itself is required; and also because where the film is cast directly upon a paper the paper tends to absorb the film in considerable quantity due to the penetrative action of the solvent, in fact such absorption may proceed at a rate which actually destroys the effect of the film by making holes therein and I have found this to be particularly true where fibers in a rough paper tend to protrude through the surface of the film when cast directly upon a paper to form a lamination; a further added advantage of directly laminating paper and film cast upon a drum is that the film has a fine highly polished surface or gloss due to the polished surface of the drum.

As is well known, rubber hydrochloride is insoluble in and resists the action of petroleum oils, alcohol, water, cold benzol and many other common substances, and therefore the advantage of obtaining a lamination of paper and thin hydrochloride rubber film of insufficient tensile strength for ordinary commercial handling by itself, is manifest. Also the advantage of my one-step process of casting and laminating film, and particularly waterproof film, upon a drum and laminating the same with paper, will be recognized, where such film is of the type having sufficient or insufficient tensile strength for ordinary commercial handling.

My invention can be readily understood from the accompanying drawing which is set forth merely for the purpose of illustrating one particular embodiment of my invention, and therefore neither the drawing nor the embodiment is to be deemed as limiting the scope of my invention.

Figures 2, 3:
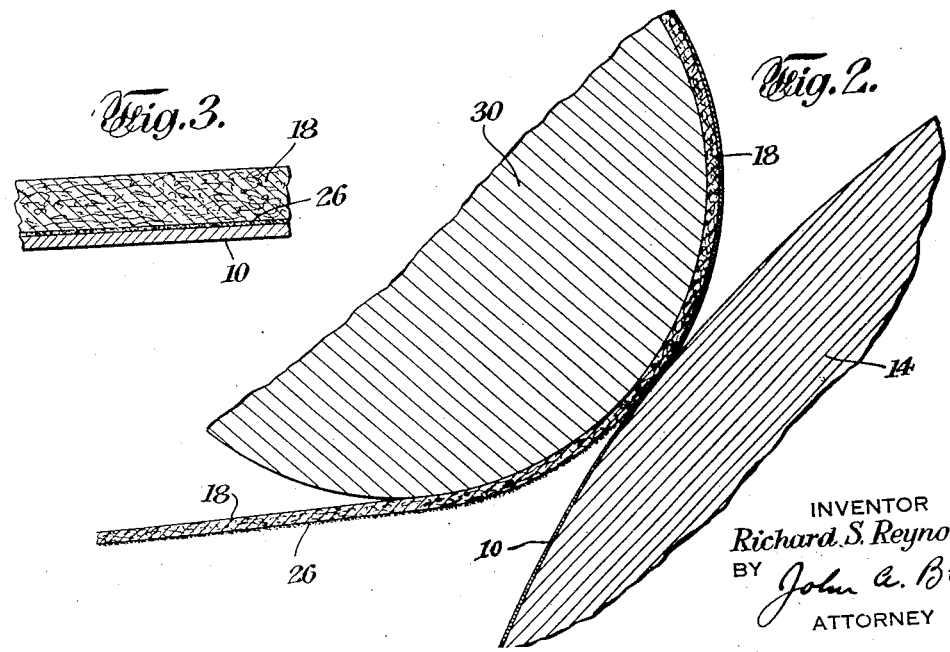

In the drawing, Fig. 1 is a diagrammatic sectional view of a film casting drum together with a paper combining attachment, with certain of the parts shown in elevation; Fig. 2 is an enlarged fragmentary sectional view of a part of the apparatus shown in Fig. 1, indicating a paper backer being applied to a film and stripping the same from a drum, and Fig. 3 is a greatly enlarged fragmentary section of a completed laminated product made in accordance with my invention.

In these figures a film 10 containing a derivative of rubber is cast upon a rigid smooth surface 12 of a drum 14, the latter preferably being of the film casting type heated to drive off volatile solvents, as is well understood in film casting. A working example of a suitable rubber derivative film is an 8% rubber hydrochloride solution in chloroform cast by hopper 16 upon the drum 14, which drum may be about five feet in diameter and may revolve about once a minute and may be heated to about 130° F. A web of paper 18 may be unwound from a roll indicated as 20 and preferably is led by suitable guide rolls indicated as 22 over an adhesive applying roll 24, so that the necessary adhesive 26 is applied against the paper to cause it to adhere to the film 10. Roll 24a cooperates with roll 24 to regulate and determine the amount of adhesive applied to the paper, and it is obvious that an adjustment of the relative positions of rolls 24a and 24 will allow heavier or lighter layers of the adhesive to be applied. An adjustable guide roll 28 tensions the paper against adhesive applying roll 24. The paper web 18 is then firmly pressed by an adjustable spring mounted roller 30 against film 10 upon drum 14. In addition to the adhesive the pressure of roller 30 and the heat of the film casting drum cause the paper and the film firmly to adhere one to another so that the film 10, of insufficient tensile strength itself for normal commercial handling, can be stripped from the drum 14 and subsequently processed if desired. In the example given, the film 10 ordinarily will be stripped from the circular drum after revolving thereon through about 315 degrees of its circumference but it is obvious that thinness of film, speed of rotation, and degree of heat are all factors which may be widely varied.

Although not indicated in the diagrammatic showing of Fig. 1, it is understood that spring mounted roller 30, and preferably roll 24, are power-driven and that the speed of the paper is synchronized with the speed of rotation of the drum so that the paper 18 and the film 10 may travel at approximately the same rate. Otherwise a dragging effect might occur which would wrinkle the film.

After the paper 18 and film 10 form a laminated product 32 the product as such may be further processed as desired, and in the example given the rubber hydrochloride film and paper product 32 in laminated form is led to a deodorizer to be deodorized.

Any suitable adhesive may be used, but I have observed that a good working adhesive is formed of 50% ethyl alcohol by weight, 37.5% copal gum by weight and 12.5% diamyl phthalate by weight in which the rubber hydrochloride is insoluble.

While the the example of my invention given above concerns the formation of a high gloss rubber derivative film of insufficient tensile strength of itself for normal commercial handling, it is obvious that my invention can be equally as well applied to similar cellulosic derivative film and that in its broader aspects my invention concerns a continuous process for the formation of a laminated product, which latter comprises film of insufficient tensile strength for normal commercial handling which has a supporting backing means provided therefor which is used to strip the same from the medium upon which the film is cast. Therefore my invention also concerns any high gloss film of insufficient tensile strength for normal commercial handling cast upon a rigid surface and stripped therefrom, firmly laminated by a thin layer of adhesive by heat and pressure to a backing means of such tensile strength as required to strip and carry the film. The backing means naturally can be any flexible means of the appropriate tensile strength, preferably paper or any sheet metal formed of animal or vegetable fiber or a metallic foil. In fact, the continuous process disclosed herein is applicable to the formation of thin metallic foils of insufficient tensile strength for normal handling upon rollers and the stripping of such metallic foils from said rollers by means of a backing means and an adhesive thereon, whereby a laminated product is continuously formed on the roll where the foil is formed.

It is therefore manifest that the specific illustrative embodiment of my invention hereinabove described is not to be deemed as limiting, and it is to be understood that various embodiments and modifications may be made within the spirit of the invention, and that such embodiments are within the scope of the appended claim.

What I claim is:

A continuous process for forming a flexible substantially waterproof laminated product comprised of a lamina of a relatively strong paper and a lamina of high gloss rubber hydrochloride film without penetration of the latter into the former, which comprises first forming and substantially drying a uniform film of rubber hydrochloride less than .0008" thick and unadapted for normal stripping because of a lack of tensile strength, upon a highly polished rigid moving surface, applying an adhesive in which said film is not soluble to a strip of paper moving at approximately the same speed as said film, then uniting said strip to said film to form a lamination, and then stripping the lamination from said moving surface by tension applied thereto through the strong paper.

RICHARD S. REYNOLDS.